United States Patent
Kim et al.

(10) Patent No.: US 6,781,793 B2
(45) Date of Patent: Aug. 24, 2004

(54) DISC CARTRIDGE

(75) Inventors: Kwang Kim, Seoul (KR); Soon-kyo Hong, Seoul (KR); Hae-sub Kweon, Gyeonggi-do (KR); Seo-young Oh, Gyeongsangbuk-do (KR); Hee-sung Park, Seoul (KR); Jung-ho Hwang, Seoul (KR)

(73) Assignee: Samsung Electronics, Co., Ltd., Suwon-si (JP)

( * ) Notice: Subject to any disclaimer, the term of this patent is extended or adjusted under 35 U.S.C. 154(b) by 167 days.

(21) Appl. No.: 10/056,071

(22) Filed: Jan. 28, 2002

(65) Prior Publication Data

US 2003/0072106 A1 Apr. 17, 2003

(30) Foreign Application Priority Data

Oct. 11, 2001 (KR) ......................................... 2001-62668

(51) Int. Cl.[7] .............................................. G11B 23/03
(52) U.S. Cl. ........................................ 360/133; 720/725
(58) Field of Search ........................ 360/133; 369/291; 720/725, 732, 734

(56) References Cited

U.S. PATENT DOCUMENTS 4,636,891 A * 1/1987 Barski ..................... 360/97.02
6,563,672 B2 * 5/2003 Yamamoto et al. ......... 360/133

FOREIGN PATENT DOCUMENTS

| JP | 8221929 | * 8/1996 | |
| JP | 10302427 A | * 11/1998 | ........... G11B/23/03 |
| JP | 11066801 A | * 3/1999 | ......... G11B/23/033 |
| WO | WO 9854717 A1 | * 12/1998 | ........... G11B/23/03 |

OTHER PUBLICATIONS

Office Action dated Jan. 19, 2004 of Chinese Patent Application No. 02102358.1.

* cited by examiner

*Primary Examiner*—William Klimowicz
(74) *Attorney, Agent, or Firm*—Staas & Halsey LLP (57) ABSTRACT

A disc cartridge having a case to accommodate a disc, a shutter to open or close an opening formed in the case to enable a recording and/or reproducing job with respect to the disc, a discharge path provided at one side of the case to allow the flow of air formed therein during rotation of the disc, and an opening/closing mechanism to open/close the discharge path. Thus, since the discharge path through which the flow of air produced inside the cartridge during rotation of a disc is smoothly discharged to the outside is provided, contamination of the disc by foreign material such as dust can be considerably reduced.

20 Claims, 10 Drawing Sheets

DISC CARTRIDGE

CROSS-REFERENCE TO RELATED APPLICATIONS

This application claims the benefit of Korean Patent Application No. 2001-62668 filed on Oct. 11, 2001, in the Korean Industrial Property Office, the disclosure of which is incorporated herein by reference.

BACKGROUND OF THE INVENTION

1. Field of the Invention

The present invention relates to a disc cartridge accommodating a disc which is an information recording and/or reproducing medium, and more particularly, to a disc cartridge in which dust therein can be efficiently discharged.

2. Description of the Related Art

Figure 1:
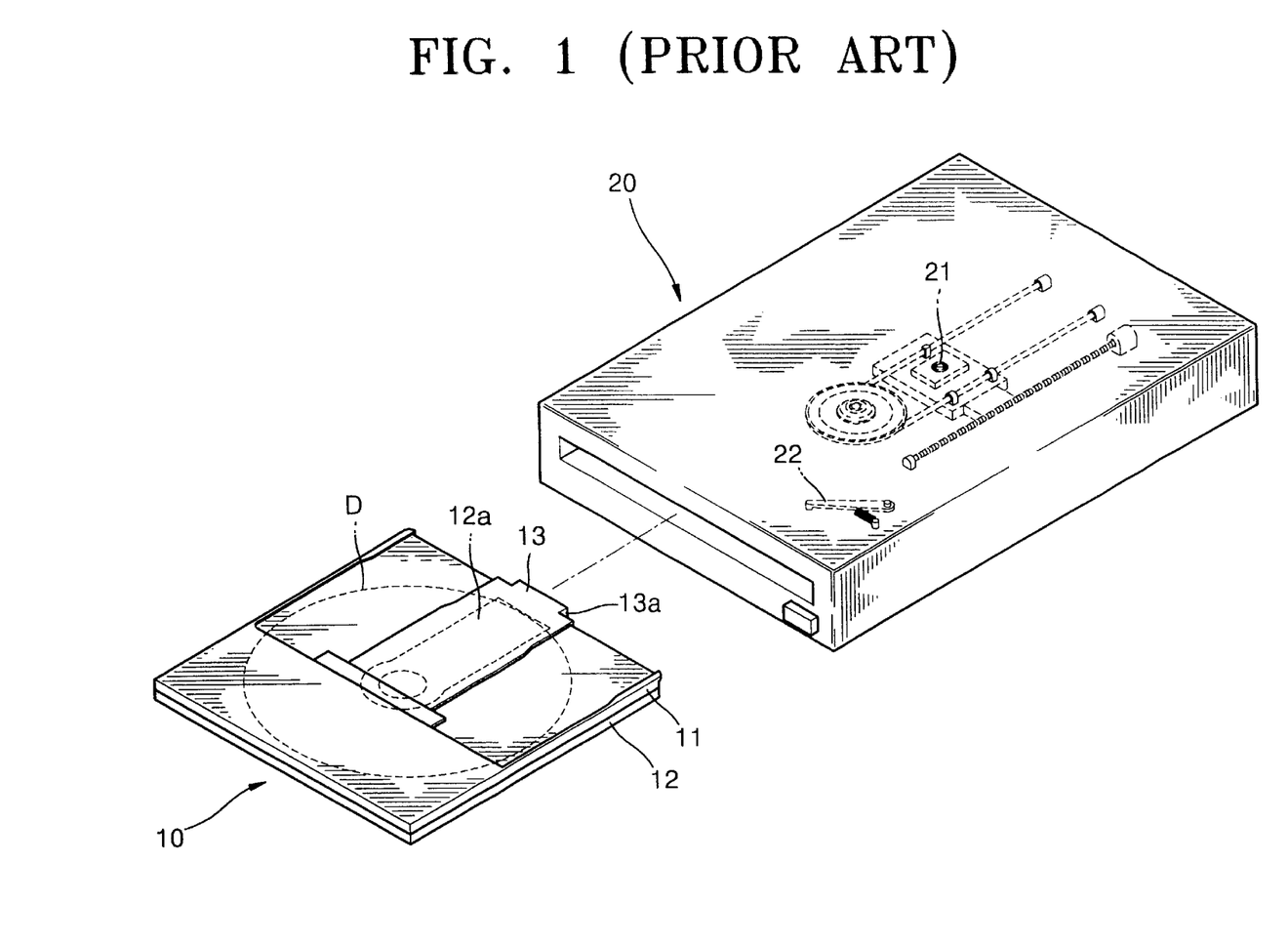
FIG. 1 is a perspective view illustrating a conventional disc cartridge installed in a recording and/or reproducing apparatus.
Figure 2A:
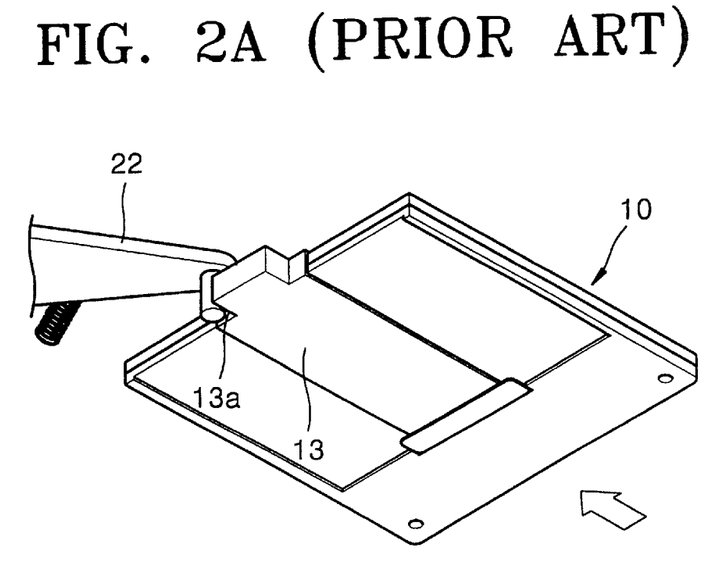
FIGS. 2A and 2B are perspective views illustrating an operation of opening a shutter of the disc cartridge shown in FIG. 1.
Figure 2B:
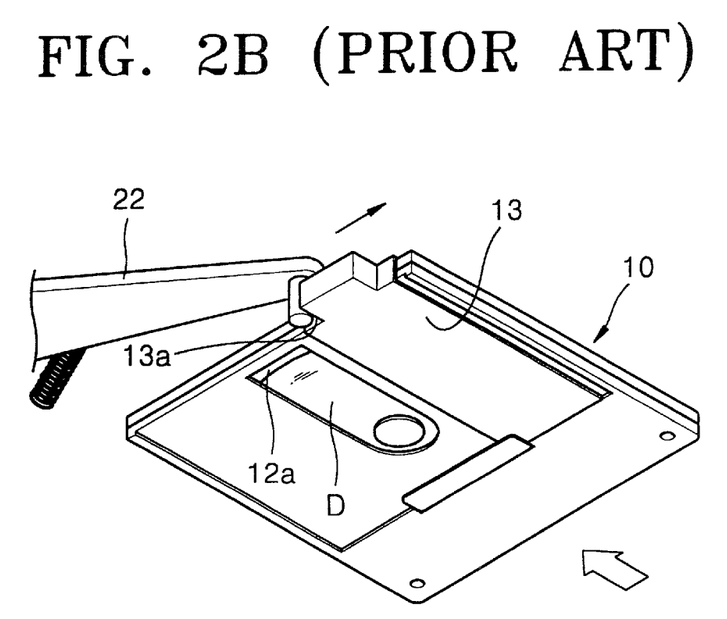

Referring to FIG. 1, a typical disc cartridge 10 accommodating a disc D used in a disc drive 20 includes upper and lower cases 11 and 12 forming an inner space where the disc D is accommodated, and a shutter 13 which selectively opens or closes an opening 12a formed in the lower case 12 so that an optical pickup 21 of the disc drive 20 can access the disc D. Reference numeral 22 denotes an opening lever installed in the disc drive 20 to open/close the shutter 13. As the cartridge 10 enters the disc drive 20, an end portion of the opening lever 22, as shown in FIGS. 2A and 2B, is rotated by being caught by a hooking step 13a of the shutter 13, to thereby open the shutter 13.

The most important reason for using the disc D in the cartridge 10 is to protect the disc D from foreign material such as dust. That is, because, in the case of using a high density disc, foreign material such as dust adhering to the surface of the disc D is more likely to prevent accurate signal processing during recording or reproduction of data on/from the disc. Accordingly, the disc is used by being accommodated in the cartridge 10 to prevent such contamination. Nevertheless, it is unavoidable that some dust still flows into the cartridge 10 through the opening 12a because the shutter 13 necessarily opens inside the disc drive 20 to allow the optical pickup 21 to access the disc D. Although the dust flowing inside the cartridge 10 may exit the cartridge through the opening 12a, a large amount of dust remains inside the cartridge 10.

Figure 3A:
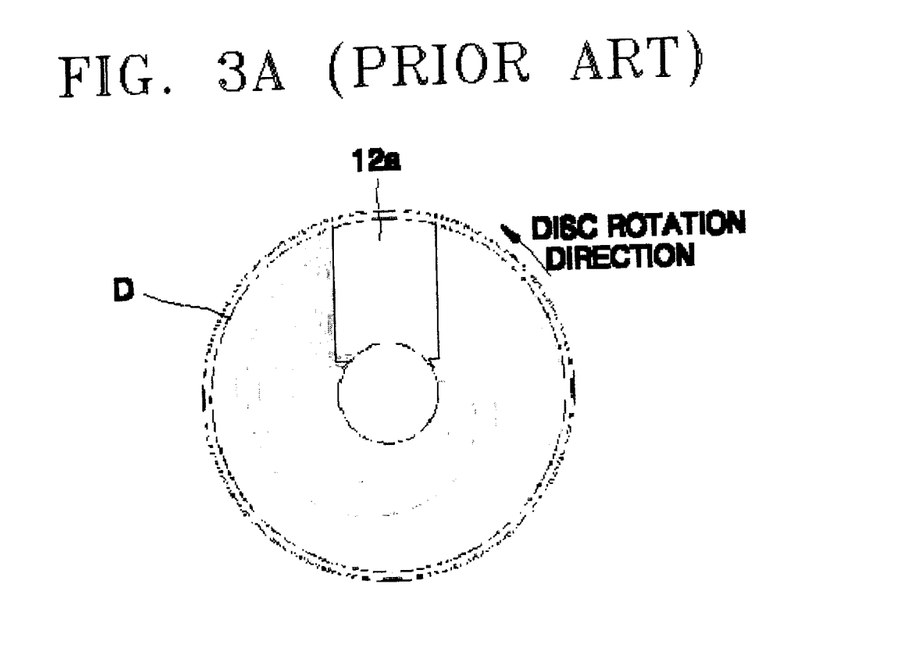
FIGS. 3A and 3B are views illustrating the results of a simulation of the flow of air produced according to rotation of a disc and a movement path of dust particles at that moment inside the disc cartridge shown in FIG. 1.
Figure 3B:
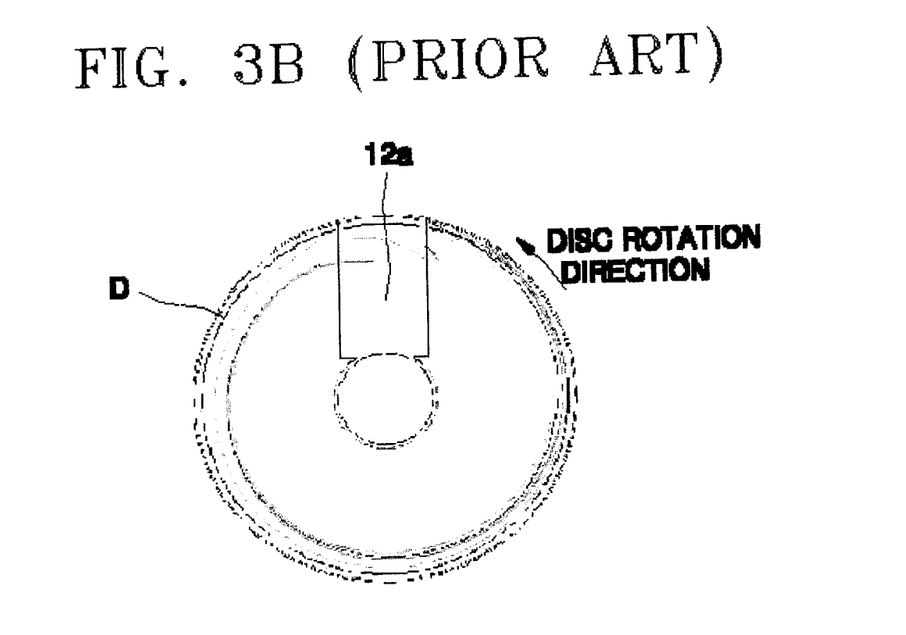

FIG. 3A shows the result of a simulation of the pattern of air flow formed inside the cartridge D as the disc D rotates. FIG. 3B shows the result of a simulation of a path along which dust particles flowing in the cartridge D are moved by the air flow. Here, it is assumed that the disc D rotates at a velocity of 5,000 r.p.m. counterclockwise and that the density and diameter of the dust particles are about 0.6 g/cm$^3$ and 1 $\mu$m, respectively. First, as shown in FIG. 3A, as the disc D rotates at the above stated velocity, the flow of air is formed in the cartridge 10 according to the direction in which the disc D rotates. Since the disc D rotates counterclockwise at a high velocity, air flow outside the cartridge 10 is drawn inward at the left side of the opening 12a due to a difference in pressure while part of the air flow inside the cartridge 10 is discharged at the right side of the opening 12a due to a centrifugal force. The dust flowing into the cartridge 10, in which the air flow is formed as stated above, rotates along with the air flow and creates a path as illustrated in FIG. 3B. Here, it can be seen that the dust is moved toward the opening 12a after rotating inside the cartridge 10 about two turns. The dust flowing in the cartridge 10 through the left side of the opening 12a is not discharged through the right side of the opening 12a after rotating only one turn, and therefore usually remains inside the cartridge 10 for a time of more than one turn. That is, the velocity at which the dust is discharged from the cartridge 10 is less than half of the velocity at which the dust flows into the cartridge 10. Accordingly, the amount of dust remaining in the cartridge 10 gradually increases. The difference between the flowing-in velocity and the discharge velocity is inversely proportional to the size of a dust particle. This is because the smaller the mass of the dust particle, the less a centrifugal force needed for discharging a dust particle from the cartridge 10 through the opening 12a.

To solve the above problems, a method of installing an additional filter in the cartridge 10 has been proposed. However, when the filter is used for a long time, it becomes saturated, and inconveniently needs to be replaced repeatedly. If the filter is not timely replaced, the dust collected by the filter may contaminate the disc D. Thus, an improved structure by which dust in the cartridge can be appropriately discharged from the cartridge without using an additional filter is required.

SUMMARY OF THE INVENTION

Accordingly, it is an object of the present invention to provide an improved disc cartridge which can effectively discharge dust introduced externally by using the flow of air produced during the rotation of a disc.

Additional objects and advantages of the invention will be set forth in part in the description which follows and, in part, will be obvious from the description, or may be learned by practice of the invention.

The foregoing and other objects of the present invention are achieved by providing a disc cartridge comprising a case to accommodate a disc, a shutter to open or close an opening formed in the case to enable a recording and/or reproducing operation with respect to the disc, a discharge path provided at one side of the case to allow the flow of air formed therein during rotation of the disc, and an opening/closing mechanism to open/close the discharge path.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 4:
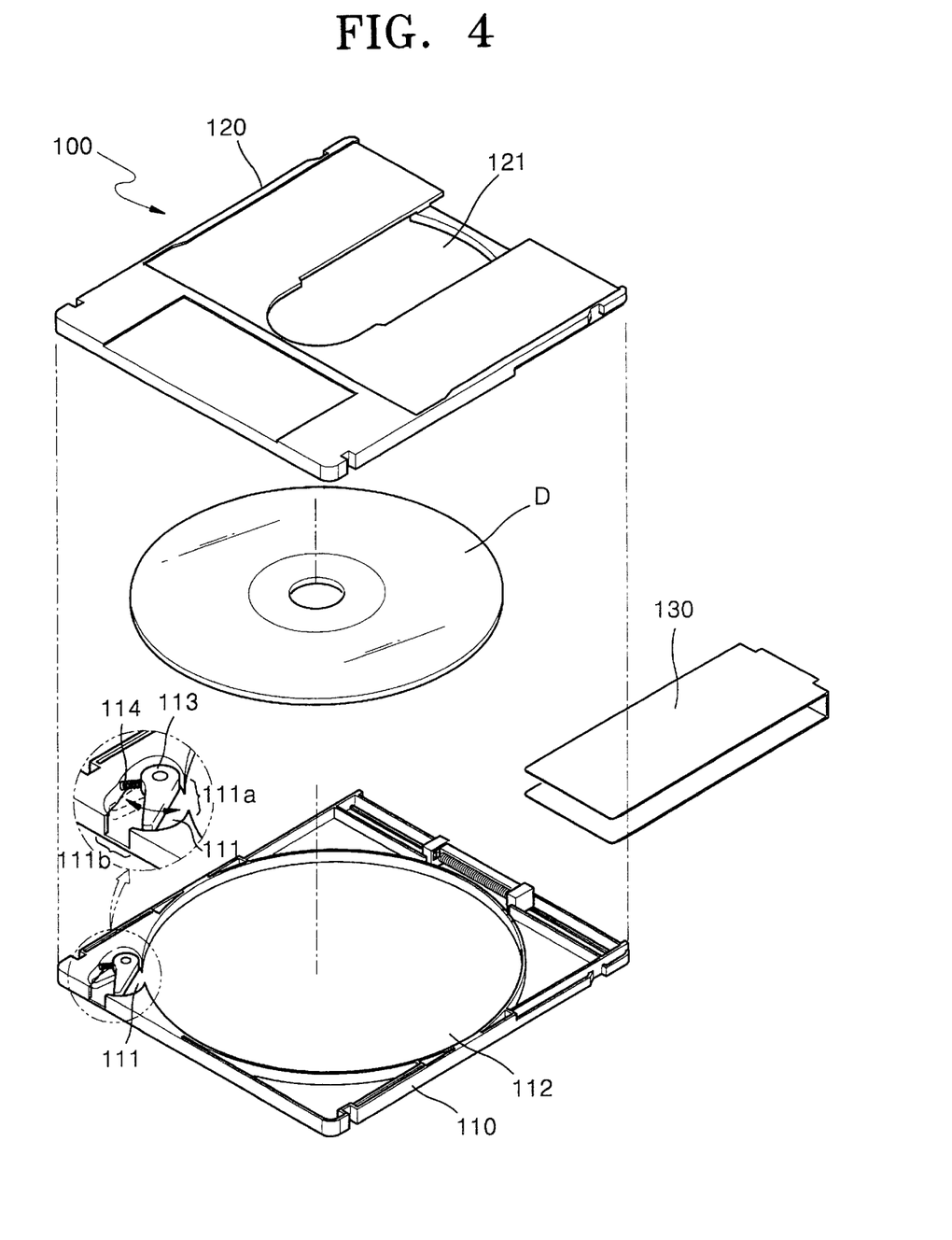
FIG. 4 is an exploded perspective view illustrating a disc cartridge according to the present invention.

Referring to FIG. 4, a disc cartridge 100 comprises upper and lower cases 110 and 120, respectively, forming a space to accommodate a disc D and a shutter 130 to selectively open/close an opening 121 formed in the lower case 120. A discharge path 111 connected to an accommodation space 112 where the disc D is accommodated, and a rotary door member 113 and a spring 114 which constitute an opening/closing mechanism to open/close the discharge path 111, are installed at the upper case 110.

That is, in the present invention, the flow of air produced during rotation of the disc D can be smoothly discharged to the outside not only through the opening 121 but also along the discharge path 111. When the disc D does not rotate, an end portion of the, rotary door member 113 that is elastically biased by the spring 114 closes the discharge path 111 to prevent outside air from entering through the discharge path 111. However, when the disc D rotates, the flow of air produced then pushes the rotary door member 113, as indicated by the doubled headed arrow, while overcoming the elastic bias of the spring 114, and is discharged from the cartridge 100. In particular, since the discharge path 111 is not formed on the radial sides of the disc D like the opening 121, but formed at a side wall to directly face a direction in which a centrifugal force according to the rotation of the disc D acts, air can be discharged more smoothly through the discharge path 111 than through the opening 121.

Figure 5A:
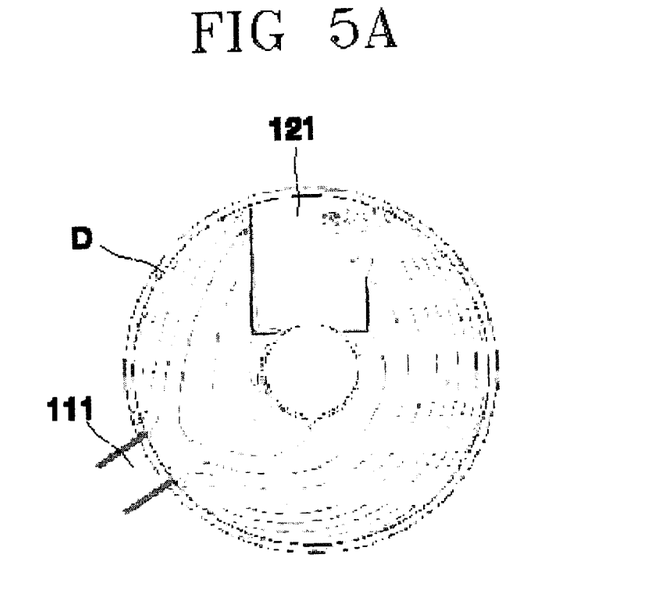
FIGS. 5A and 5B are views illustrating the results of a simulation of the distribution of pressure produced according to rotation of a disc and a movement path of dust particles at that moment inside the disc cartridge shown in FIG. 4, respectively.
Figure 5B:
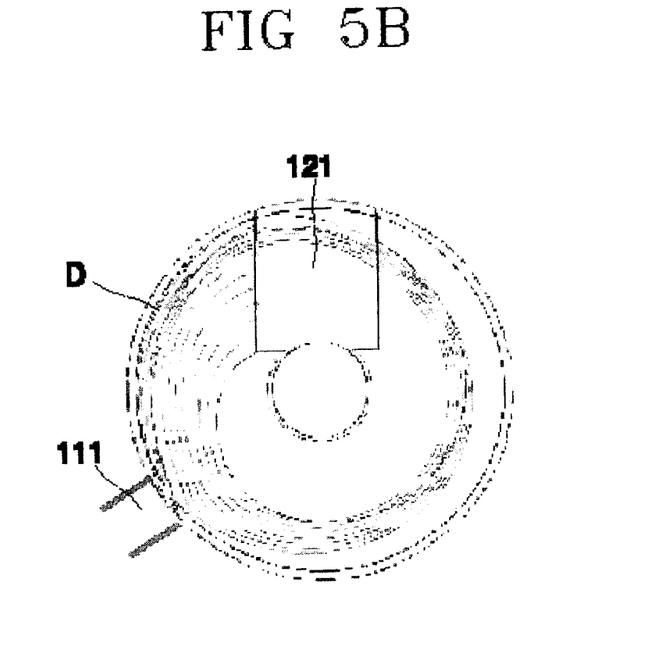

FIGS. 5A and 5B illustrate the results of a simulation of the flow of air according to rotation of the disc D and movement of dust particles at that moment in the cartridge 100 where the discharge path 111 is formed at the side wall of the case 110. Here, it is assumed that the disc D rotates counterclockwise at a velocity of 5,000 r.p.m. and that the density and diameter of the dust particles are approximately 0.6 g/cm$^3$ and 1 μm, respectively.

First, referring to FIG. 5A which shows the distribution of pressure inside the cartridge 100, a vortex occurs around the opening 121, making the distribution of pressure unstable. However, it can be seen that a drop of pressure drastically occurs around the discharge path 111 and outward along the discharge path 111. This means that while the air is not smoothly discharged through the opening 121 due to the vortex, the air is smoothly discharged through the discharge path 111. Referring to FIG. 5B, which shows a movement path of dust particles, dust particles flowing in through the left side of the opening 121 are discharged through the discharge path 111 immediately or after rotating only one turn. That is, since the air is smoothly discharged through the discharge path 111, when dust flows into the cartridge 100, it can be directly discharged through the discharge path 111. Preferably, the width of an outlet hole 111b (refer to FIG. 4) of the discharge path 111 is formed to be smaller than an inlet hole 111a (refer to FIG. 4) of the discharge path 111 to facilitate the discharge of air. When the discharge path 111 is formed to be narrower toward the outside, since a difference in pressure between the inlet hole 111a and the outlet hole 111b is generated, discharge of the internal air can be expedited further.

According to the above structure, since the flow of air is formed to be smoothly discharged through the discharge path 111 while a recording and/or reproducing operation is performed during rotation of the disc D, even when dust flows in through the opening 121, dust is prevented from accumulating inside the cartridge 100.

Meanwhile, the discharge path 111 of FIGS. 5A and 5B is shown as a straight path for the convenience of explanation. However, the efficiency of discharge of air may be changed depending on the shape of the discharge path. That is, the efficiency of discharge of air can be improved by making the widths of the inlet hole 111a and the outlet hole 111b different or by making the shape of the discharge path different.

FIGS. 6A through 9C show the results of simulations of the relationship between the shape of the discharge path and the efficiency of discharge of air.

Figure 6A:
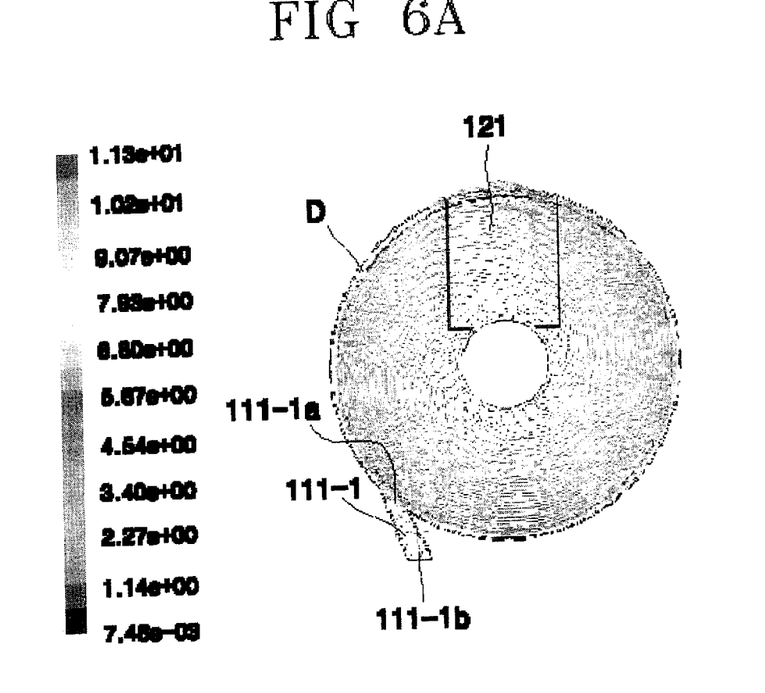
FIGS. 6A and 6B are views illustrating the results of a simulation of the distribution of velocity and the distribution of pressure when a discharge path is modified to a first shape in the disc cartridge shown in FIG. 4, respectively.
Figure 6B:
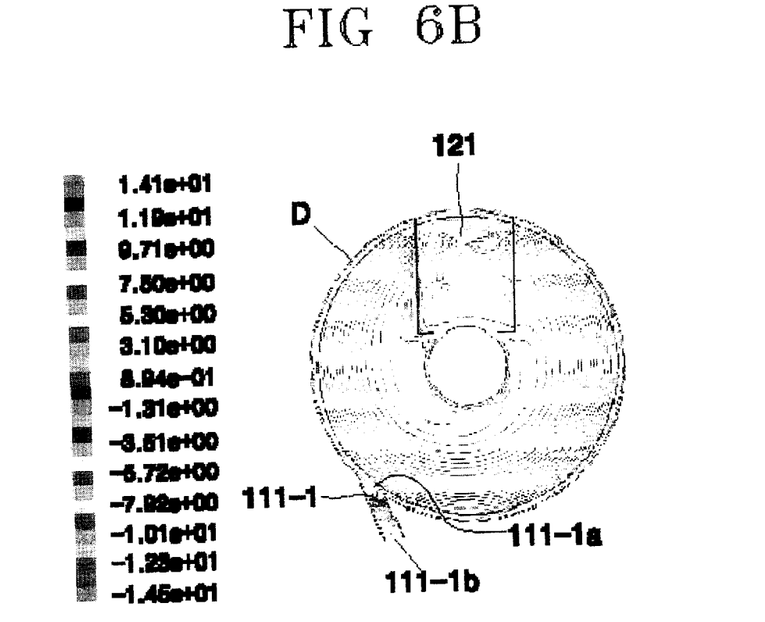

First, FIGS. 6A and 6B show the distribution of velocity and the distribution of pressure, respectively, when the width of an outlet hole 111-1b is formed to be greater than that of an inlet hole 111-1a, unlike the structure as described in FIGS. 5A and 5B. Here, FIG. 6A shows velocity vectors 0.2 mm above the surface of the disc D. It can be seen that a vortex occurs around a discharge path 111-1. The vortex hinders the flow of air in the cartridge 100 from being discharged smoothly through the discharge path 111-1 and dust particles may easily adhere to around a surface of a portion where the vortex occurs.

FIG. 6B shows isobaric lines. Referring to FIG. 6B, a severe change in pressure is generated at the right side of the discharge path 111-1, which is believed to cause a vortex. When the discharge path 111-1 is formed to have a diffuser shape such that the outlet hole 111-1b is wider than the inlet hole 111-a, as in the present embodiment, a separation is produced which creates the vortex. Thus, the flow of air becomes unstable and dust particles may not be discharged effectively.

Figure 7A:
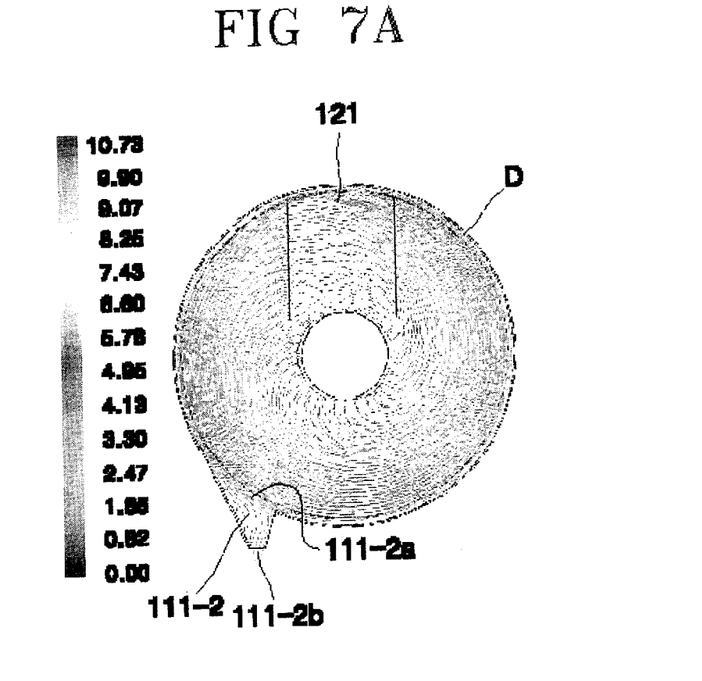
FIGS. 7A and 7B are views illustrating the results of a simulation of the distribution of velocity and the distribution of pressure when a discharge path is modified to a second shape in the disc cartridge shown in FIG. 4, respectively.
Figure 7B:
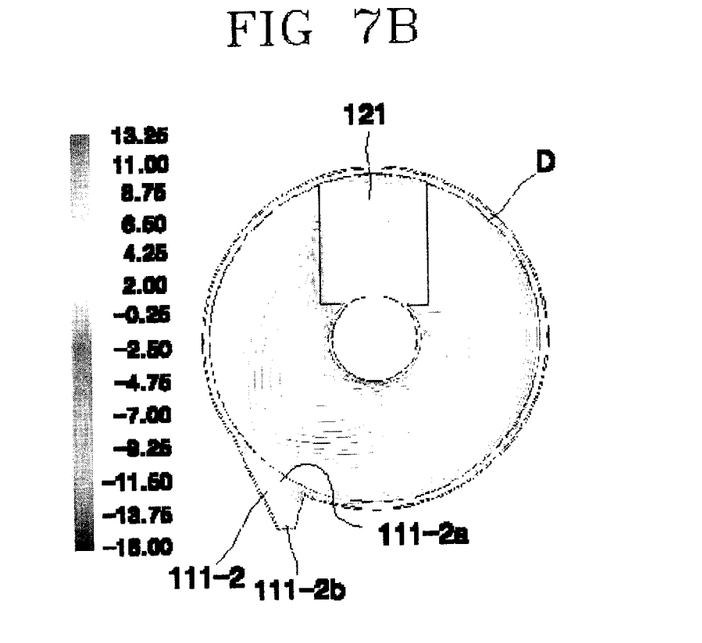

Next, FIGS. 7A and 7B show the distribution of velocity and the distribution of pressure, respectively, when the width of an inlet hole 111-2a is formed to be greater than that of an outlet hole 111-2b. In this case, since a difference in pressure between the inlet hole 111-2a and the outlet hole 111-2b helps air to be discharged, the velocity vector of air discharged externally is faster and more stably formed than in the case shown in FIG. 6A. That is, since the effect of the vortex is less than that in the case of FIG. 6A, the possibility of dust particles remaining in the cartridge decreases. However, referring to FIG. 7B, illustrating the distribution of pressure, it can be seen that a dense pressure distribution exists at the right side of the inlet hole 111-2a. The existence of the dense pressure distribution is assumed to be caused by the flow of air bumping against the right side of the inlet hole 111-2a while rotating counterclockwise. Thus, the above distribution of pressure hinders a smooth flow of air toward the outlet hole 111-2b through the discharge path 111-2.

Figure 8A:
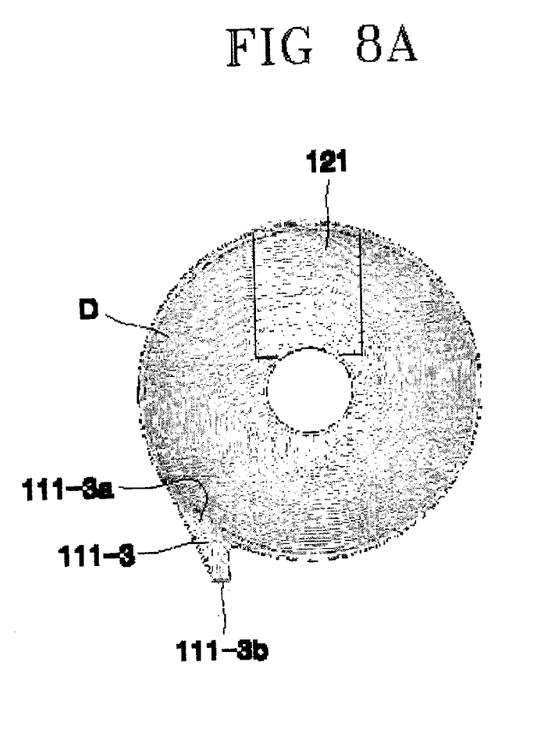
FIGS. 8A and 8B are views illustrating the results of a simulation of the distribution of velocity and the distribution of pressure when a discharge path is modified to a third shape in the disc cartridge shown in FIG. 4, respectively.
Figure 8B:
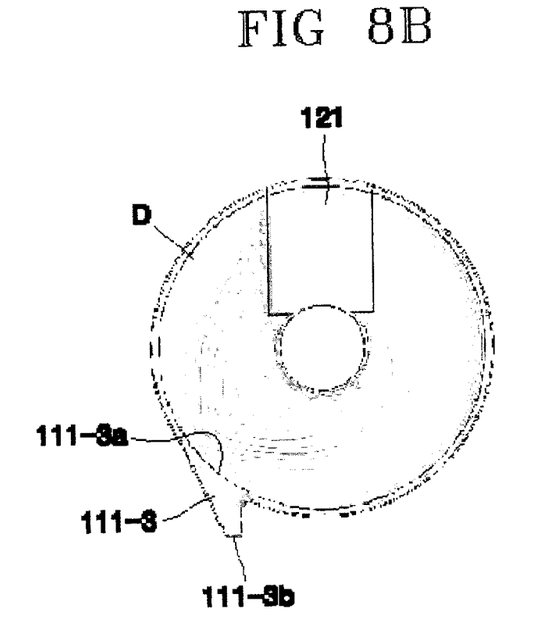

In FIGS. 8A and 8B, the right side of an inlet hole 111-3a against which the flow of air bumps is formed to be round while the width of the inlet hole 111-3a of a discharge path 111-3 is formed greater than an outlet hole 111-3b. However, it can be seen that the result of forming the right side of the inlet hole 111-3a to be round is almost the same as in the cases shown in FIGS. 7A and 7B. That is, even when the right side of the inlet hole 111-3a is formed to be round, the possibility of the flow of air bumping against the right side of the inlet hole 111-3a while rotating counterclockwise is similar to the above-described cases.

Figure 9A:
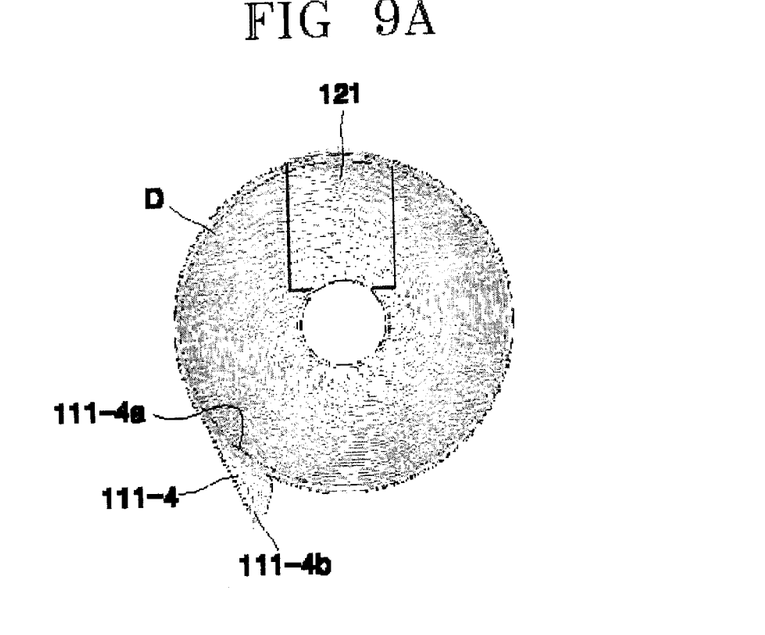
FIGS. 9A through 9C are views illustrating the results of a simulation of the distribution of velocity, the distribution of pressure, and a movement path of dust particles when a discharge path is modified to a fourth shape in the disc cartridge shown in FIG. 4, respectively.
Figure 9B:
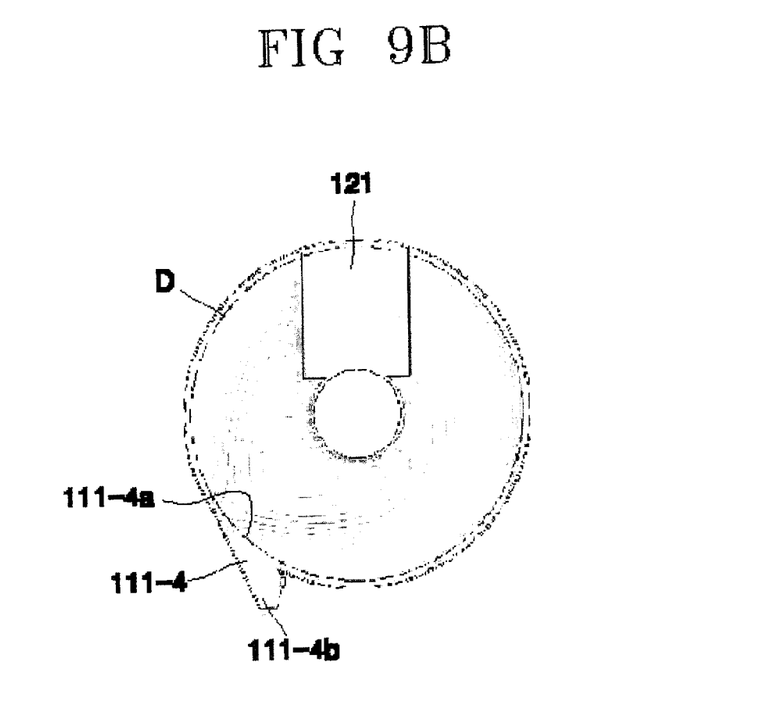
Figure 9C:
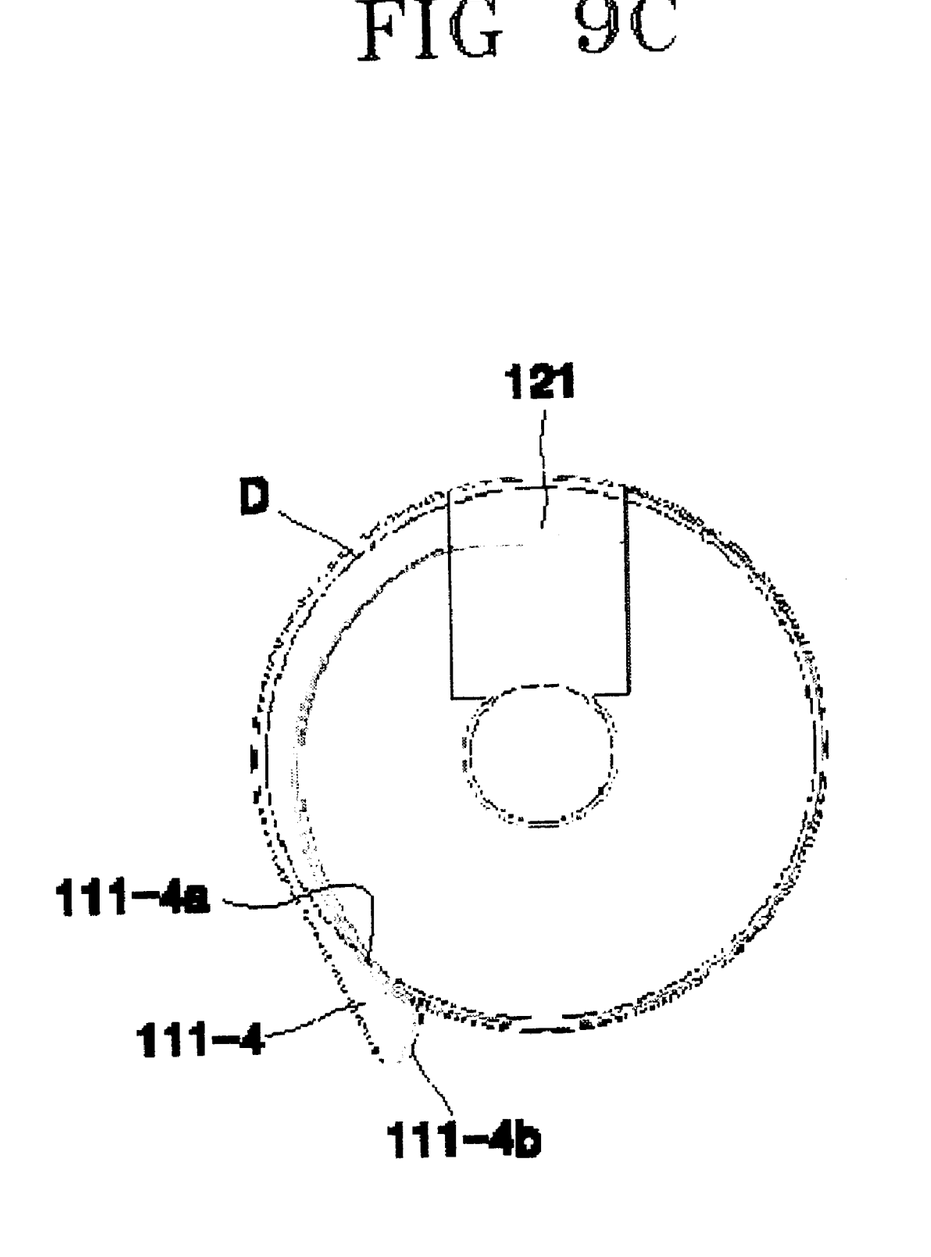

To solve the above problems, as shown in FIGS. 9A through 9C, the right side of an inlet hole 111-4a of a discharge path 111-4 is formed to have a tip shape. Also, a path from the tip toward an outlet hole 111-4b is formed to have a curvature in a direction opposite to the air flow rotation direction within the cartridge 100. This is to minimize the area where air bumps against the right side of the inlet hole 111-4a and to promote smooth discharge of air through the outlet hole 111-4b. As a result, vortexing or bumping of air does not occur around the discharge path 111-4 and the air is smoothly discharged. Dust particles are smoothly discharged along the curvature of the discharge path 111-4 as shown in FIG. 9C.

Thus, air can be smoothly discharged by providing the discharge path 111 in the cartridge 100. Also, when the discharge path 111 is formed as shown in FIGS. 9A through 9C, air can be discharged even more smoothly. Accordingly, the possibility of dust remaining inside the cartridge 100 is reduced so that an error in signal processing is decreased or eliminated.

As described above, according to the disc cartridge of the present invention, since the discharge path through which the flow of air produced inside the cartridge during rotation of a disc is smoothly discharged to the outside, contamination of the disc by foreign material such as dust can be considerably reduced.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A disc cartridge for receiving a disc comprising:
   a case to accommodate the disc and having an opening to enable a recording and/or reproducing operation with respect to the disc;
   a shutter to open or close the opening;
   a discharge path provided at one side of the case to allow a flow of air formed during a rotation of the disc to exit the case; and
   an opening/closing mechanism to open/close the discharge path, wherein;
   the discharge path comprises:
     an inlet hole formed in the case close to the disc; and
     an outlet hole connected to the inlet hole and facing outside the case,
     the inlet hole being formed relatively greater than the outlet hole, and
     a portion of the inlet hole against which the flow of air bumps is formed to have a tip shape, and a path toward the outlet hole is formed to be bent at a curvature in a direction opposite to a direction in which the flow of air rotates within the case.

2. The disc cartridge claimed in claim 1, wherein the opening/closing mechanism comprises:
   a rotary door member rotatably installed at the case and selectively opening/closing the discharge path; and
   an elastic member to elastically bias the rotary door member to close the discharge path,
   wherein the flow of air produced inside the case according to the rotation of the disc rotates the rotary door member while overcoming the elastic bias of the elastic member and is discharged through the discharge path.

3. The disc cartridge as claimed in claim 2, wherein:
   the case includes a door opening communication with the discharge path,
   when the flow of air produced inside the case according to the rotation of the disc rotates the rotary door member, the rotary door member closes the door opening so as to open the discharge path, and
   when the flow of air is not produced inside the case according to the rotation of the disc, the rotary door member closes the discharge path so as to open the door opening.

4. The disc cartridge as claimed in claim 2, wherein the rotary door member is pivotably attached to the case at a first end, and the first end is thicker than a second end disposed opposite the first end.

5. The disc cartridge claimed in claim 1, wherein the opening/closing mechanism comprises:
   a door member rotatably installed at the case and selectively opening/closing the discharge path; and
   a member which opens the door member during the rotation of the disc relative to the case, and closes the door member when the disc does not rotate relative to the case.

6. The disc cartridge claimed in claim 5, wherein:
   during the rotation of the disc relative to the case of at least a predetermined speed, a pressure of a predetermined amount is formed at the door member, and
   the member opens the door member during the rotation of the disc when the predetermined amount of the pressure is formed at the door member, and closes the door member when the disc does not rotate relative to the case sufficient to provide the predetermined amount of pressure.

7. The disc cartridge claimed in claim 6, wherein the member includes a biasing member that provides a biasing force that is less than a force generated on the door member by the predetermined amount of the pressure.

8. The disc cartridge claimed in claim 6, wherein, during rotation of the disc, the shutter opens the opening and a portion of the air formed during the rotation of the disc is discharged through the opening in addition to being discharged through the discharge path.

9. A disc cartridge for receiving a disc, comprising:
   a case to accommodate the disc;
   a shutter to open or close an opening formed in the case to enable a recording and/or reproducing operation with respect to the disc;
   a discharge path provided at a side wall of the case to directly face a direction in which a centrifugal force according to a rotation of the disc acts, to allow air to be discharged from the case during the rotation of the disc; and an opening/closing mechanism to open/close the discharge path according to the rotation of the disc, wherein a portion of the discharge path against which bumps a flow of air generated during the rotation of the disc bumps has a tip shape, and the discharge path has a curvature in a direction opposite to a direction in which the flow of air rotates within the case.

10. The disc cartridge claimed in claim 9, wherein the opening/closing mechanism comprises:

a rotary door member rotatably installed at the case and selectively opening/closing the discharge path; and an elastic member to elastically bias the rotary door member to close the discharge path, wherein a flow of air produced inside the case according to the rotation of the disc rotates the rotary door member while overcoming the elastic bias of the elastic member and is discharged through the discharge path.

11. The disc cartridge claimed in claim 10, wherein:

the case includes a door opening in communication with the discharge path, when the flow of air produced inside the case according to the rotation of the disc rotates the rotary door member, the rotary door member closes the door opening so as to open the discharge path, and when the flow of air is not produced inside the case according to the rotation of the disc, the rotary door member closes the discharge path so as to open the door opening.

12. A disc cartridge for receiving a disc, comprising:

a case to accommodate the disc;

a shutter to open or close an opening formed in the case to enable a recording and/or reproducing operation with respect to the disc;

a discharge path provided at a position spaced away from radial sides of the disc, to allow air to be discharged from the case during a rotation of the disc; and an opening/closing mechanism to open/close the discharge path according to the rotation of the disc, wherein a portion of the discharge path against which bumps a flow of air generated during the rotation of the disc bumps has a tip shape, and the discharge path has a curvature in a direction opposite to a direction in which the flow of air rotates within the case.

13. The disc cartridge claimed in claim 12, wherein the opening/closing mechanism comprises:

a rotary door member rotatably installed at the case and selectively opening/closing the discharge path; and an elastic member to elastically bias the rotary door member to close the discharge path, wherein a flow of air produced inside the case according to the rotation of the disc rotates the rotary door member while overcoming the elastic bias of the elastic member and is discharged through the discharge path.

14. The disc carbide claimed in claim 12, wherein the air to be discharged is made to flow due to the rotation of the disc, and the opening/closing mechanism opens the discharge path to discharge the air made to flow due to the rotation of the disc, and closes the discharge path when the disc does not rotate.

15. The disc cartridge claimed in claim 14, wherein the air to be discharged and which is made to flow due to the rotation of the disc forms a pressure of a predetermined amount at the opening/closing mechanism, and the opening/closing mechanism opens the discharge path during the rotation of the disc when the predetermined amount of the pressure is formed at the opening/closing mechanism, and closes the discharge path when the disc does not rotate relative to the case sufficiently to provide the predetermined amount of pressure.

16. The disc cartridge claimed in claim 15, wherein the opening/closing mechanism includes a biasing member that provides a biasing force that is less than a force generated on the opening/closing mechanism by the predetermined amount of the pressure.

17. A disc cartridge for receiving a disc comprising:

a case to accommodate the disc and having an opening to enable a recording and/or reproducing operation with respect to the disc;

a shutter to open or close the opening;

a discharge path provided at one side of the case to allow a flow of air formed during a rotation of the disc to exit the case, and comprising an inlet hole disposed in the case close to the disc and an outlet hole connected to the inlet hole and facing outside the case; and an opening/closing mechanism to open/close the discharge path, wherein a portion of the inlet hole against which the flow of air bumps has a tip shape, and a path toward the outlet hole has a curvature in a direction opposite to a direction in which the flow of air rotates within the case.

18. The disc cartridge claimed in claim 17, wherein the opening/closing mechanism comprises:

a door member rotatably installed at the case and selectively opening/closing the discharge path; and a member which opens the door member during the rotation of the disc relative to the case, and closes the door member when the disc does not rotate relative to the case.

19. The disc cartridge claimed in claim 18, wherein:

during the rotation of the disc relative to the case of at least a predetermined speed, a pressure of a predetermined amount is formed at the door member, and the member opens the door member during the rotation of the disc when the predetermined amount of the pressure is formed at the door member, and closes the door member when the disc does not rotate relative to the case sufficiently to provide the predetermined amount of pressure.

20. The disc cartridge claimed in claim 19, wherein the member includes a biasing member that provides a biasing force that is less than a force generated on the door member by the predetermined amount of the pressure.

* * * * *

UNITED STATES PATENT AND TRADEMARK OFFICE
CERTIFICATE OF CORRECTION

PATENT NO. : 6,781,793 B2
DATED : August 24, 2004
INVENTOR(S) : Kwang Kim et al.

It is certified that error appears in the above-identified patent and that said Letters Patent is hereby corrected as shown below:

Title page,
Item [73], Assignee, delete "," after "Electronics".

Column 6,
Line 15, insert -- in -- after "opening".

Column 7,
Line 54, change "carbidge" to -- cartridge --.

Signed and Sealed this

Fourteenth Day of December, 2004

JON W. DUDAS
*Director of the United States Patent and Trademark Office*